United States Patent [19]

Fisli

[11] 4,425,655
[45] Jan. 10, 1984

[54] DIRECT FOCUSSED GAS LASER

[75] Inventor: Tibor Fisli, Los Altos Hills, Calif.

[73] Assignee: Xerox Corporation, Stamford, Conn.

[21] Appl. No.: 276,237

[22] Filed: Jun. 22, 1981

[51] Int. Cl.³ .............................................. H01S 3/08
[52] U.S. Cl. .................................... 372/101; 372/107; 372/61
[58] Field of Search ................. 372/101, 107, 108, 99, 372/98, 61, 33, 65, 55; 350/319

[56] References Cited

U.S. PATENT DOCUMENTS 3,942,133  3/1976  Kutay et al. ........................... 372/33

Primary Examiner—William L. Sikes
Assistant Examiner—Léon Scott, Jr.
Attorney, Agent, or Firm—Franklyn C. Weiss

[57] ABSTRACT

A direct focussed gas laser 9 wherein the last surface 40, 48A, 48B of the output mirror, in the case of a laser where the mirrors are integral to the ends of the laser tube envelope, is shaped such that it produces a cone 42, or wedge shaped 70, beam. A spherical surface provides a cone-shaped beam, while cylindrical surfaces produce a wedge shaped beam. In the case of a Brewster type laser, the envelope-enclosing windows are correspondingly shaped.

4 Claims, 2 Drawing Figures

MODULATOR
DEFLECTOR

DIRECT FOCUSSED GAS LASER

This invention relates to a direct focussed gas laser which permits focussing without the need for an externally placed lens in the path of the emitted light.

BACKGROUND OF THE INVENTION

In general, commercially available gas laser tubes, such as the helium-neon lasers available from several manufacturers, are designed to produce a near collimated beam by shaping the last surface of the output mirror such that after refraction all "rays" are close-to-parallel with the axis of the laser cavity. In other words, the laser beam last exiting the surface of the tube produces a near-plane wavefront. However, a great majority of laser based optical systems require focusing of the collimated beam. The components required to accomplish this include a properly coated singlet lens, a precisely matched lens barrel, a mount for the lens barrel, and a means for holding this assembly in a precise location with respect to the exiting laser beam. Highly skilled labor trained to use relatively sophisticated instruments for alignment of the laser/lens arrangement is also required.

According to the present invention, a technique is utilized for focusing the output beam from a laser at an appreciable optical distance from the laser optical cavity without intervening optical elements. The present invention provides a direct focused gas laser wherein the last surface of the output mirror, in the case of a laser where the mirrors are integral to the ends of the laser tube envelope, is shaped such that it produces a cone, or wedge, shaped beam with the required F/number. A spherical surface provides a cone-shaped beam whereas a cylindrical surface produces a wedge-shaped beam. In the case of Brewster type laser, the envelope-enclosing windows are correspondingly shaped. The economic advantage of utilizing this technique is apparent since it eliminates all material and labor normally required for focusing a laser beam and requires less volume for packing the laser in laser based optical systems.

DESCRIPTION OF THE DRAWINGS

For a more complete understanding of the invention, reference is made to the following detailed description of the invention in conjunction with the drawings wherein.

DETAILED DESCRIPTION OF THE INVENTION

Figure 1:
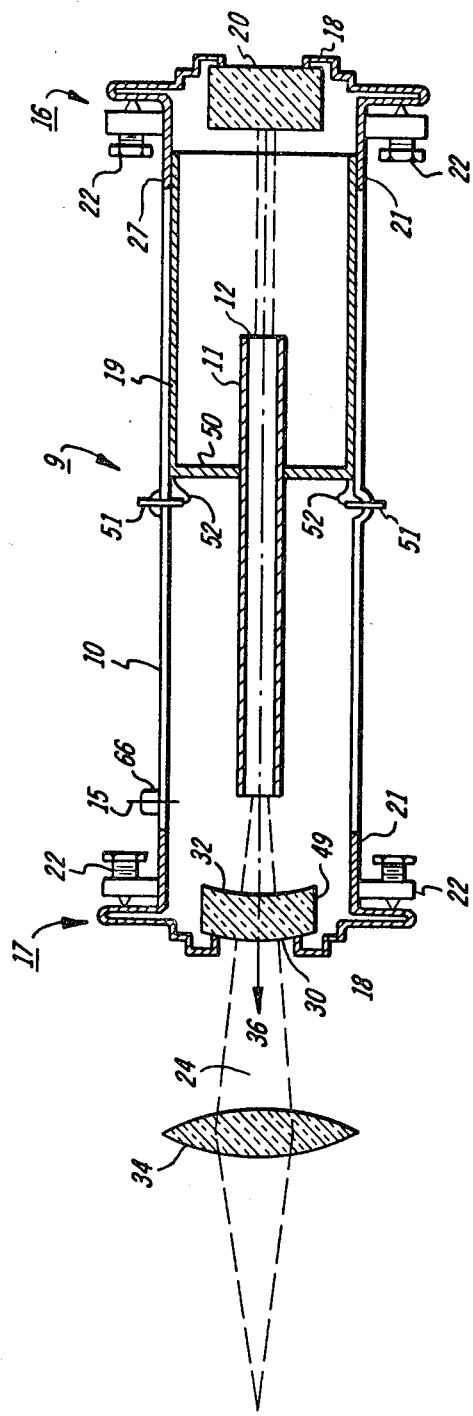
FIG. 1 shows, in simplified form, a typical prior art internal mirror laser tube configuration.

FIG. 1 shows, in a simplified representation, a typical prior art internal mirror gas laser tube showing the mirrors utilized to form the resonant cavity.

In FIG. 1 there is shown an outer envelope 10 of a gas laser 9. Coaxially disposed and structurally integrated with envelope 10 is an elongated capillary discharge tube 11 having an open end region 12 communicating with the interior region of envelope 10.

An anode pin 15, formed of conductive material, is introduced into the interior region of envelope 10 via glass feed through 66. Envelope 10 and capillary discharge tube 11 are fabricated of glass, quartz, or other suitable dielectric material and together with anode 15 and integral end members 16 and 17 form a hollow gas-tight structure for containing the gaseous medium such as helium and neon. End members 16 and 17 comprise an apertured flange member 18, mirrors 49 and 20 bonded to the flange members 18, a metal flange member 21 sealed to each end of the tube envelope 10 which is welded to flange member 18 and mirror adjustment screws 22. Mirror 30 is selected to allow laser light 36 to be emitted from the laser. The laser mirrors 49 and 20 are coated for particular wavelengths of the laser transition and form an integral part of the whole laser device.

A cathode electrode 19 of cylindrical cross-section is disposed within envelope 10, with its outer surface of envelope 10. Cathode 19 extends longitudinally from one end of envelope 10 near end member 16 toward the opposite end. There is a longitudinal overlap of cathode 19 and capillary discharge tube 11. An annular supporting ring 50 is mechanically joined to cathode 19, thereby lending structural support and spacing for capillary discharge tube 11 and cathode 19.

Many materials may be used as cold cathodes in laser discharge tubes as, for example, aluminum or tantalum, each having a thin oxide layer. Supporting ring 50 can be formed of the same material or other suitable conductive or dielectric materials without detracting appreciably from the operation of the present invention.

Conductive pin 51 extends through envelope 10 and is joined to cathode 19 by means of spring-like conductor 52. In addition to providing electrical coupling, pin 51, with conductor 52, also provides structural support to cathode 19.

In operation, the gas through which the electrical discharge is to take place is confined within the structure of FIG. 1, usually at a very low pressure. To establish the electrical discharge, a suitable power supply of conventional design, not shown, is connected between the cathode 19 and anode 15 by means of pins 15 and 51. The power supply, as is well-known in the art, should be capable of providing a relatively high voltage at a relatively low current. The magnitudes of the voltage and current are largely determined by the particular design requirements of the discharge tube.

Electrons emitted from the inner surface of cathode 19, traverse a path through the open end 12 of capillary discharge tube 11 on their way to anode 15 where they are collected. The emitted electrons, in traversing this path interact with the gas within the discharge tube, thereby ionizing a portion of the atoms thereof and creating the desired discharge and energy level population inversion.

Virtually all commercially available internal mirror plasma tubes utilize plano-concave optical resonator cavities and virtually all of these utilize a spherical mirror, such as mirror 49 shown in FIG. 1, for coupling energy out of resonator. This choice is universally made by laser tube vendors because of the larger output spot and longer Rayleigh range that results since these parameters suit the general purpose market. Output beam collimation is provided by spherically contouring the second (outer) surface 30 of this spherical output mirror where the radius of curvature of surface 30 is approximately ⅓ that of the first (inner) surface 32. The general purpose laser plasma tube shown in FIG. 1, is, however, unsuited to minimum cost integration in a raster output scanning system, since the collimated output beam 24 must be externally focused by additional elements represented by lens 34. Coupling a focused light beam out of the spherical mirror end of the plano-concave cavity provides advantages of reduced laser tube cost.

Figure 2A:
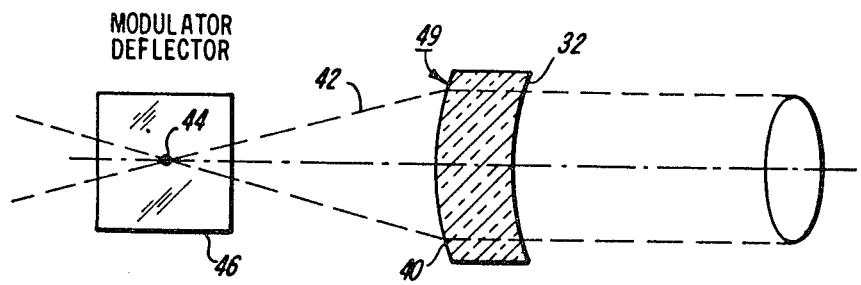
FIGS. 2(a) and 2(b) illustrate how the laser mirror shown in FIG. 1 is shaped to provide a direct focused laser beam.
Figure 2B:
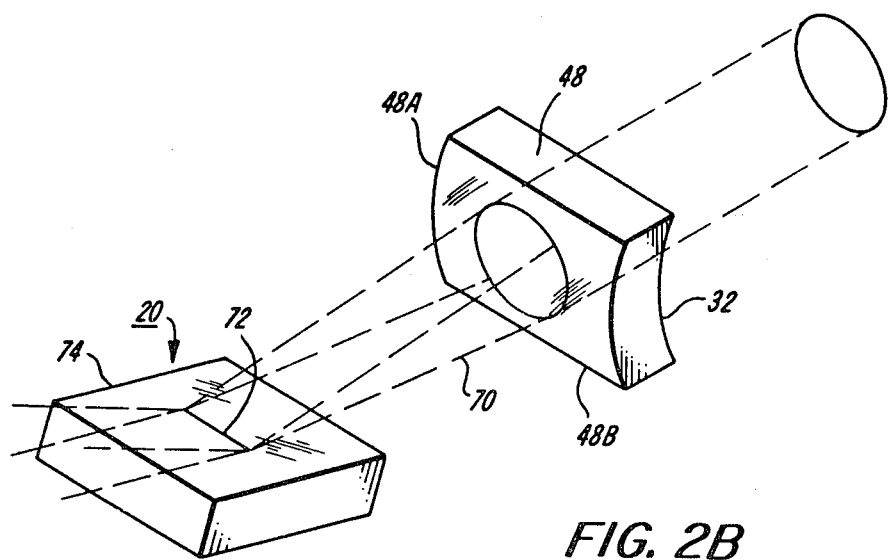

Referring now to FIGS. 2(a) and 2(b), the required modifications to mirror 49 are illustrated. In FIG. 2(a) the spherical surface 30 of mirror 49 is replaced by a predetermined (shorter) radius 40 to form a cone with the desired F-number that goes into focus at point 44. In accordance with the specific application of the laser window so modified, an acousto-optic modulator/deflector is positioned at the location of spot 44 and operated in the desired laser scanning mode. If the laser beam diameter is about 0.63 mm, then a typical radius for spherical surfaces 32 and 40 would be about 300 mm and 25.3 mm, respectively, for a F/100 cone.

In FIG. 2(b) the outisde surface of mirror 48 is shaped as a bent cylinder lens known as a toroid. The radius of cylindrical surface 48-A (typically about 25.3 mm) controls the F-number of wedge 70 thereby determining the position of line-focus 72. The radius of the bent cylindrical surface 48-B (typically about 100 mm) controls the length of the line focus. If the bending of surface 48-B is given the same radius as the spherical surface 30 in FIG. 1, prior art, the length of the line focus 72 will be the same as the beam diameter at the output mirror. A smaller radius would produce a shorter line-focus and a greater radius a longer line-focus. The inner radius of curvature 32 for both FIGS. 2A and 2B would typically be 300 mm and the focal length about 63 mm.

As set forth hereinabove with respect to FIG. 2(b), a modulator/deflector 74 is positioned at the location line-focus 72 as part of the desired laser scanning system.

While the invention has been described with reference to its preferred embodiment, it will be understood by those skilled in the art that various changes may be made and equivalents may be substituted for elements thereof without departing from the true spirit and scope of the invention. Further, many modifications may be made to adapt particular situations or materials to the teaching of the invention without departing from its essential teachings.

What is claimed is:

1. A gas laser (9) comprising an outer envelope (10), an elongated capillary discharge tube (11) coaxially disposed and structurally integrated with said envelope (10), end members (16, 17) sealed to each end of the tube envelope (10) wherein the improvement is characterized by:

lens means (49) mounted in said end members (16, 17), one of said lens means being completely mirrored on the inside surface thereof for complete internal reflection and the other lens means being partially mirrored to allow the laser light to be emitted from said laser (9), the said other lens means having the outside surface thereof in a shape such that the lens means focuses said laser light at a predetermined point away from said laser, wherein the outside surface (48a) of said other lens means (48) is cylindrically formed such that the output light beam is wedge shaped (70) and focused to a line (72), said outside surface of said other lens means being in the shape of a toroid, said toroid having a cylindrical radius of first dimension (48a) and a second bent cylindrical radius of a second dimension (48b), wherein the first dimension (48a) controls the position of said line (72) and the second dimension (48b) controls the length of said line (72).

2. The laser as set forth in claim 1 wherein said first dimension (48A) is about 25.3 mm, said second dimension (48B) is about 100 mm, and the focal length of said lens is about 63 mm.

3. A gas laser (9) comprising an outer envelope (10), an elongated capillary discharge tube (11) coaxially disposed and structurally integrated with said envelope (10), end members (16, 17) sealed to each end of the tube envelope (10) wherein the improvement is characterized by:

lens means (49) mounted in said end members (16, 17), one of said lens means being completely mirrored on the inside surface thereof for complete internal reflection and the other lens means being partially mirrored to allow the laser light to be emitted from said laser (9), the said other lens means having the outside surface thereof in a shape such that the lens means focuses said laser light at a predetermined point away from said laser, wherein the outside surface (40) of said other lens means (49) is spherically formed such that the output light beam is cone shaped (42) and focused to a spot (44), the radius of curvature of said outside surface (40) of said other lens means (49) being less than $\frac{1}{3}$ the radius of curvature of the radius of curvature of the inside surface (32) of said other lens means (49), wherein the radius of curvature of said outside surface (40) is about 25.3 mm, the radius of curvature of said inside surface (32) is about 300 mm.

4. The laser as set forth in claim 3 wherein the focal length of said lens means (49) is about 63 mm.

* * * * *